Patented May 14, 1946

2,400,271

UNITED STATES PATENT OFFICE 2,400,271

STRONTIUM CHROMATE PIGMENTS AND METHODS OF PREPARING THE SAME

James D. Todd, Louisville, Ky., assignor to Kentucky Color and Chemical Company, Louisville Ky., a corporation of Kentucky No Drawing. Application February 19, 1942, Serial No. 431,493

6 Claims. (Cl. 23—56)

This invention relates to pigments and their preparation, and more particularly, to pigments containing strontium chromate especially adapted for use in primers for preventing the corrosion of metallic surfaces as suggested in British Patent #370,949 of April 11, 1932.

While strontium chromate has been proposed as an ingredient of such primers, the physical characteristics and the harmful impurities present in such chromate, as prepared by processes known heretofore, have militated against its satisfactory employment and have compelled the use of the less satisfactory chromates of lead and zinc. Because of the manner of operation of such primers which are particularly adapted to the protection of relatively highly active metals such as aluminum and magnesium, the physical characteristics and the degree of purity are highly important. In operation such primers combine with moisture to form a chromate solution which protects the base metal. If the chromate be in such form that it will not readily dissolve in the water or contains impurities which will dissolve in the water and act as corrosives, the primer is of considerably less benefit.

Some of the processes hitherto proposed for the preparation of strontium chromate have involved the use of the chromates of sodium, calcium and potassium in combination with the chlorides, nitrates or hydroxides of strontium. When chlorides and nitrates are used, undesirable by-products result, such as the nitrates and chlorides of sodium and potassium which cannot be eliminated to the desired degree from the final pigment. Consequently they operate as corrosives in the pigment, rendering it unsatisfactory for use, particularly on aluminum and magnesium. Moreover, the numerous washings that are required to reduce such impurities to a minimum remove considerable quantities of the precipitated chromate, which is somewhat soluble, and reduce the yield.

When the hydroxides are employed in place of the chlorides or nitrates, the by-product is the hydroxide of sodium, calcium or potassium. Thus the chromate is precipitated in a mixture which always has an exceedingly high pH value and in a form that is not satisfactory for use in pigments of the type desired. The precipitation of strontium chromate in a mixture that is always alkaline has been found to cause the formation of relatively large particles of chromate which tend to occlude the hydroxide in a manner whereby it cannot be removed by washing. Consequently such chromates are not satisfactory for use as primers because of the corroding action of the occluded alkali.

Fusion methods for the preparation of chromates have been proposed. The resulting product is dense, compact and entirely unsuited for use as a pigment. As such fusions are made in the presence of salt, the resultant products are always characterized by a high chloride content which prevents the use of the product as a pigment.

In addition to the aforesaid impurity content, chromate as heretofore made, has occurred in the form of relatively large particles which have been unsuited for satisfactory use in pigments of the type herein described.

It is an object of my invention to provide a new and more desirable form of strontium chromate that is of particular advantage in pigments of the metallic primer type.

A further object of my invention is the provision of novel methods of preparing strontium chromate wherein the yield is increased, there are no undesirable by-products, the resultant product is purer than products heretofore produced and is especially characterized by a minimum content of chlorides, nitrates and other impurities which act as corrosives.

The present invention contemplates the preparation of strontium chromate by combining one or more starting compounds of the metal, such as the carbonate, oxide or hydroxide, with chromic acid under predetermined conditions whereby no undesirable by-products, which would tend to contaminate the final precipitate and react against its use in primers of the type described, are obtained, and the chromate is produced in a physical form that is especially suitable in primers of the type described. Generally, a slurry or mixture of the starting compound is prepared with water, the mixture having a pH value in the alkaline range. Preferably, the mixture, when the carbonate is used, is treated with sufficient carbon dioxide to change the pH value over into the acid range wherein the reactivity of the starting compound is apparently increased, resulting in a more complete reaction. This increased reactivity is believed to be due to the temporary formation of bicarbonates or acid carbonates which are more soluble and react more readily with the subsequently added chromic acid. Chromic acid is added, and the excess of carbon dioxide removed by stirring, boiling or aerating. The mixture is then returned to a pH value in the alkaline range by the addition of an alkalizing agent such as ammonia which does not leave any undesirable by-products. The subsequent precipitate may or may not be washed prior to drying. The precipitated chromate, so recovered, is substantially devoid of harmful impurities and the yield is exceedingly high. The chromate is in the form of relatively fine particles, at least 60% of which are less than 1 micron in size as determined by conventional methods based on Stokes' law. Because of such fineness and substantially complete freedom from impurities the pigment disperses readily in a vehicle and remains well in suspension. If impurities are present, they tend to cement the small particles into agglomerates during drying thus increasing the apparent particle size with a greater tendency to settle. Additionally, such pigment functions particularly well in a vehicle of the type described where it combines with moisture to protect the coated metal surface, and has actually been found by prolonged tests to provide more effective protection over longer periods of time.

When the starting compound is strontium hydroxide, it is unnecessary to use carbon dioxide because the hydroxide is more soluble than the carbonate. In such case, a slight excess of chromic acid is added so that the pH value of the mixture upon completion of the precipitation is in the acid range.

While in the case of the carbonate as a starting compound, the mixture or slurry is weakly acid prior to the addition of the chromic acid, and in the case of the hydroxide, the mixture is alkaline, it has been found that the chromates precipitated therefrom are substantially identical in physical structure provided that in each case the mixture upon the completion of the precipitation is acid; and are entirely different from the chromates precipitated in a mixture wherein the final pH is in the alkaline range. This has been found to be true despite the fact that the mixture containing the final precipitate is made alkaline before the precipitate is removed therefrom.

As examples of methods for preparing the chromate of my invention, attention is called to the following:

*Example 1*

295 parts of strontium carbonate, by weight (commercial CP grade), was mixed with 500 parts of water and heated to 80 to 100° C. for one hour with agitation. The mixture thickened and became very viscous. Agitation was halted and the mixture allowed to stand several hours. It was then diluted with 400 parts of cold water, at which time the pH value was between 8.5 and 9.5. Sufficient carbon dioxide was then passed through the solution with stirring until the pH value was well within the acid range, i. e., between 5.5 and 6.0.

200 parts of commercial chromic acid in 500 parts of water were added while stirring during the course of about an hour, the temperature being maintained between 25 to 35° C. Carbon dioxide was liberated and a brownish-red bulky precipitate was formed. At the end of the strike, the pH was found to be between 5.0 and 5.5. Stirring was continued and air passed through the mixture until the pH had increased to about 6.0, the carbon dioxide being driven from the mixture. Ammonia was added to change the pH value back into the alkaline range, i. e., between 8.0 and 9.0, ten to twenty-five lbs. of 26° Baumé ammonia being added. The quantity of ammonia added is governed by the amount of carbon dioxide retained in the mixture.

After the ammonia had been added the precipitated chromate changed in color to a bright yellow and the particles were in the shape of fine needles. After drying, the product analyzed to a minimum of 98% strontium chromate. It had a specific gravity of 3.6.

A so-called technical grade of strontium carbonate, which contains about 93% strontium carbonate, 2% barium carbonate, 2% calcium carbonate, the balance being metallic oxides of the $R_2O_3$ type, and silicates, may be substituted for the commercial CP grade of strontium carbonate used in the example just described. None of the impurities present will be harmful in the finished product as the barium carbonate will be converted to the moderately insoluble barium chromate, the calcium carbonate to slightly soluble basic calcium chromate, and the metallic oxides and silicates will remain unchanged. Since metallic silicates are frequently added to primers, this may be even beneficial. The resultant product has been found to analyze a minimum of 95% $RCrO_4$, where R is strontium, barium and calcium, in approximately the proportions found in the strontium carbonate.

In the foregoing example, where up to 5% carbonates is not a harmful ingredient of the primer or paint, the aerating step may be omitted.

If desired the addition of carbon dioxide may be omitted, reliance being had upon the carbon dioxide generated from the carbonate by the chromic acid. However, it has been found that the reaction is not as complete as desired and the final product may be contaminated with occluded particles of the original strontium carbonate.

*Example 2*

In Example 1, strontium hydroxide or strontium oxide may be used in place of the carbonate. When the hydroxide is used, 242 parts thereof are preferably employed, but due to its greater solubility, it is not necessary to add any carbon dioxide. When strontium oxide is used, 206 parts are preferred as the oxide will slake to the hydroxide. Sufficient chromic acid is added in this case to cause the mixture to have a final pH value in the acid range when the reaction is completed, a return being made to the alkaline range, preferably with ammonia, as in Example 1.

The strontium chromate produced by the methods herein described has been found to be especially valuable as a pigment in primers of the type described, primarily because of its very fine particle size and shape and the absence of water-soluble impurities. If desired, this pigment may be used singly or it may be combined in desired proportions with barium chromate of the type described in my copending application to obtain any desired degree of solubility within limits so that the protective action of the $CrO_3$ ions may remain effective over longer or shorter periods, and the compound pigment balanced to fit the conditions of exposure.

While special reference has been made herein to the use of the strontium chromate of this invention in connection with the protection of relatively active metals, such as magnesium, it is to be understood that it is applicable as well to the protection of any metallic surfaces subject to corrosion, such as iron and steel surfaces, and the like.

It will be noted, in Examples 1 and 2, that approximate molecular proportions of acid and strontium compound are employed. For example, a commercial CP grade of strontium carbonate is approximately 98% in strength; hence 295 pounds of this grade, as in Example 1, is equivalent to 1.96 mols. Likewise 295 pounds of a technical grade of strontium carbonate contains 274 pounds of pure strontium carbonate and 5.9 pounds of each of the other carbonates, namely barium and calcium, all of which are equivalent to 1.943 mols. Commercial chromic acid runs better than 99½% pure so that 200 pounds approximates 1.99 mols. Thus, the slight excess of acid over the molecular proportions approximates 1½ to 2½%.

Having described my invention, I claim:

1. A method of preparing normal strontium chromate of relatively fine particle size and substantial freedom from ingredients harmful to the use of the chromate in metallic primers for the protection of corrodible metals, comprising: mixing a strontium compound, which is selected from a group consisting of the oxide, hydroxide and carbonate, and which is suspended in water, with chromic acid in the approximate stoichiometric proportions necessary to form the normal chromate and in an environment substantially free of alkali metal ions to effect a reaction which directly forms a precipitate of normal strontium chromate, the hydrogen-ion concentration of the mixture being acidic after the chromic acid addition and remaining acidic to the end of the reaction; the ingredients employed being substantially free of elements which form alkali metal compounds and water soluble chlorides, nitrates and sulphates, whereby only easily separable by-products such as carbon dioxide and water are formed; and separating the precipitated chromate from the mixture.

2. The method according to claim 1 wherein the pH value of the mixture is raised to the alkaline range prior to the separation of the precipitated chromate therefrom.

3. The method of claim 1 wherein, sufficient ammonia is added to the mixture upon the completion of the reaction and prior to the separation of the precipitate, to raise the pH of the mixture to the alkaline range.

4. The method of claim 1 wherein, the pH value of the mixture is raised to a value ranging from 8 to 9 upon the completion of the reaction and prior to the separation of the precipitate.

5. The method of claim 1 wherein the strontium compound suspension is treated with carbon dioxide gas to establish an acidic pH in the suspension prior to the acid addition.

6. The method of claim 1 wherein: the strontium compound suspension is treated with carbon dioxide gas to establish an acidic pH in the suspension before the acid addition; and the pH value of the mixture, upon the completion of the reaction and prior to the separation of the precipitate, is raised to the alkaline range.

JAMES D. TODD.